United States Patent
Yang et al.

(10) Patent No.: US 10,674,366 B2
(45) Date of Patent: Jun. 2, 2020

(54) DATA TRANSMISSION METHOD AND DEVICE, AND SPECTRUM RESOURCE SHARING METHOD AND DEVICE

(71) Applicant: ZTE Corporation, Shenzhen (CN)

(72) Inventors: Ling Yang, Shenzhen (CN); Wei Gou, Shenzhen (CN); Chenchen Zhang, Shenzhen (CN); Liyuan Zhong, Shenzhen (CN); Bo Dai, Shenzhen (CN); Yajun Zhao, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 50 days.

(21) Appl. No.: 15/541,312

(22) PCT Filed: Nov. 4, 2015

(86) PCT No.: PCT/CN2015/093809
§ 371 (c)(1),
(2) Date: Jun. 30, 2017

(87) PCT Pub. No.: WO2016/107281
PCT Pub. Date: Jul. 7, 2016

(65) Prior Publication Data
US 2017/0359730 A1 Dec. 14, 2017

(30) Foreign Application Priority Data

Dec. 31, 2014 (CN) .......................... 2014 1 0854088

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0486* (2013.01); *H04W 74/08* (2013.01); *H04W 72/1215* (2013.01); *H04W 74/0808* (2013.01)

(58) Field of Classification Search
CPC . H04W 16/14; H04W 72/0486; H04W 74/08; H04W 74/0808; H04W 72/1215;
(Continued)

(56) References Cited

U.S. PATENT DOCUMENTS

2011/0009145 A1\* 1/2011 Pirinen ................. H04W 16/14
455/509
2012/0106504 A1\* 5/2012 Klatt ..................... H04W 16/12
370/330
(Continued)

FOREIGN PATENT DOCUMENTS

CN 103841564 A 6/2014
CN 103891334 A 6/2014
(Continued)

OTHER PUBLICATIONS

International Search Report for corresponding application PCT/CN2015/093809 filed on Nov. 4, 2015; dated Jan. 19, 2016.
(Continued)

*Primary Examiner* — Jeffrey M Rutkowski
*Assistant Examiner* — Sudesh M Patidar
(74) *Attorney, Agent, or Firm* — Cantor Colburn LLP

(57) ABSTRACT

Provided are a data transmission method and device, and a spectrum resource sharing method and device. According to the data transmission method, a first system acquires, from shared spectrum resources, a dedicated resource of the first system and/or a contention resource obtained by the first system based on contention; and the first system transmits data by using the dedicated resource and/or the contention resource.

16 Claims, 4 Drawing Sheets

(51) Int. Cl.
*H04W 74/08* (2009.01)
*H04W 72/12* (2009.01)

(58) Field of Classification Search
CPC ... H04W 48/12; H04W 74/002; H04W 48/16; H04W 88/06; H04W 88/10; H04W 72/04; H04W 72/12
See application file for complete search history.

(56) References Cited

U.S. PATENT DOCUMENTS

| | | | | |
|---|---|---|---|---|
| 2012/0287879 | A1* | 11/2012 | Nentwig | H04W 76/36 370/329 |
| 2013/0114558 | A1 | 5/2013 | Wang | |
| 2014/0112289 | A1 | 4/2014 | Kim | |
| 2014/0126515 | A1* | 5/2014 | Nordin | H04W 72/1273 370/329 |
| 2014/0335883 | A1* | 11/2014 | Ericson | H04W 52/26 455/452.2 |
| 2015/0085683 | A1* | 3/2015 | Sadek | H04L 43/0894 370/252 |
| 2015/0133079 | A1* | 5/2015 | Smith | H04W 16/14 455/406 |
| 2016/0174078 | A1* | 6/2016 | Salem | H04W 28/26 370/329 |
| 2017/0006474 | A1* | 1/2017 | Zhao | H04M 15/60 |
| 2017/0048722 | A1* | 2/2017 | Van Phan | H04W 16/16 |

FOREIGN PATENT DOCUMENTS

| | | |
|---|---|---|
| CN | 104247488 A | 12/2014 |
| WO | 2013006110 A2 | 1/2013 |
| WO | 2014189916 A2 | 11/2014 |
| WO | 2014190465 A1 | 12/2014 |

OTHER PUBLICATIONS

Bruce A. Black, "Chapter 1—Introduction, In: to Wireless Systems", May 31, 2008, Prentice Hall, XP055433507, pp. 1-16.
European Search Report for corresponding application EP15874966; Report dated Dec. 8, 2017.

* cited by examiner

DATA TRANSMISSION METHOD AND DEVICE, AND SPECTRUM RESOURCE SHARING METHOD AND DEVICE

TECHNICAL FIELD

The present disclosure relates to the field of communications, and more particularly to a data transmission method and device, and a spectrum resource sharing method and device.

BACKGROUND

At present, a Long-Term Evolution (LTE) system is operated by being deployed in licensed carriers. However, with the rapid increase of data services, a licensed spectrum may not be able to bear such a great data traffic. Therefore, an important evolution direction of subsequent LTE development is to deploy LTE in a shared spectrum (e.g., spectrum resource) and to share data traffics in the licensed carriers through the shared spectrum.

In addition, the shared spectrum has advantages as follows:

1. free or low expense (the shared spectrum is not required to be purchases);
2. low access requirement, and low cost (both individuals and enterprises can deploy the shared spectrum);
3. large available bandwidth (unlicensed bands of, e.g., 5 GHz and 2.4 GHz, may be utilized);
4. resource sharing (when multiple different systems operate based on the shared spectrum or different operators of an identical system operate the shared spectrum, some resource sharing modes may be utilized to improve the spectrum efficiency);

more wireless access technologies (the wireless access may need to be implemented across different communication standards and may have some difficulty in collaboration, and network topology is diversified);

more wireless access stations (involving large number of users, which causes high difficulty in collaboration and large centralized management overheads); and more applications (multiple services are mentioned to be capable of being operated based on the shared spectrum, such as Machine to Machine (M2M) and Vehicle to Vehicle (V2V).

However, multiple systems, including a Wireless Fidelity (Wi-Fi) system, may also work on the same shared spectrum. Therefore, it may be needed to solve the problem of coexistence of the LTE system with one or more other systems when working on the shared spectrum.

Any effective solution has not been provided yet at present for the above-mentioned problem.

SUMMARY

Some embodiments of the present disclosure provide a data transmission method and device, and a spectrum resource sharing method and device, which may be able to at least solve the problem where a solution for coexistence of an LTE system with one or more other systems on shared spectrum resources has not been provided yet.

According to an exemplary embodiment of the present disclosure, a data transmission method is provided, which may include the following act. A first system acquires, from shared spectrum resources, a dedicated resource of the first system and/or a contention resource obtained by the first system based on contention. The first system transmits data by using the dedicated resource and/or the contention resource.

In an exemplary embodiment of the present disclosure, the first system may acquire the dedicated resource of the first system and/or the contention resource obtained by the first system based on contention from the shared spectrum resources divided based on one of the following division modes:

a first division mode of dividing the shared spectrum resources into a dedicated resource of the first system, a dedicated resource of a second system, and a resource obtained by a system based on contention; or, a second division mode of dividing the shared spectrum resources into: a dedicated resource of the first system, and a resource obtained by a system based on contention; or a dedicated resource of a second system, and a resource obtained by a system based on contention.

In an exemplary embodiment of the present disclosure, the dedicated resource of the first system may include: a data transmission time T2 of the first system within a preset time period T1; and/or the dedicated resource of the second system may include: a data transmission time T3 of the second system within the preset time period T1; and/or the resource obtained by a system based on contention may include: a data transmission time T4 obtained by a system based on contention within the preset time period T1.

In an exemplary embodiment of the present disclosure, the resource obtained by a system based on contention may be determined based on one of the following manners: only allowing a transmission node in the first system to participate in contention within the T4; or, only allowing a transmission node in the second system to participate in contention within the T4; or, simultaneously allowing a transmission node in the first system and a transmission node in the second system to participate in contention within the T4.

In an exemplary embodiment of the present disclosure, resource sharing may be performed, within the T2 and/or the T3, based on one of the following resource sharing modes:

dividing the T2 and/or the T3 into the following time periods: a data transmission time of a transmission node belonging to a first operator, a data transmission time of a transmission node belonging to a second operator, and a contention time between transmission nodes belonging to different operators; or, dividing the T2 and/or the T3 into the following time periods: a data transmission time of a transmission node belonging to a first operator, and a data transmission time of a transmission node belonging to a second operator;

dividing the T2 and/or the T3 into the following time periods: a data transmission time for data transmission of transmission nodes in an identical system, and a contention time between transmission nodes in an identical system.

In an exemplary embodiment of the present disclosure, the T2, the T3 and the T4 may be determined based on one of the following determination modes:

a first determination mode of allocating a fixed value to the T4, and dynamically adjusting a ratio of the T2 to the T3, where a contention priority of the first system or the second system within the T4 changes based on the dynamically adjusted ratio of the T2 to the T3; or, a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system.

In an exemplary embodiment of the present disclosure, in the second determination mode, the first system may be a Wi-Fi system, and the second system may be an LTE system.

In an exemplary embodiment of the present disclosure, in the first determination mode, the ratio of the T2 to the T3 may be dynamically adjusted based on one of the following rules:

adopting a default configuration mode;

respectively collecting statistics on resources actually occupied, within the T2 and the T3, by the first system and the second system within a statistical time period T, and adjusting the ratio of the T2 to the T3 within a next statistical time period T based on a statistical result, where T≥2T1; or, adjusting the ratio of the T2 to the T3 within the current T1 based on effective occupation time lengths of the T2 and the T3 within a previous T1.

In an exemplary embodiment of the present disclosure, when the shared spectrum resources are divided, the method may further include one of the following acts. A maximum occupation time threshold of the dedicated resource of the first system is set. Or a maximum occupation time threshold of the dedicated resource of the second system is set.

According to another embodiment of the present disclosure, a spectrum resource sharing method is also provided, which may include the following acts. Shared spectrum resources are divided based on one of the following division modes: dividing the shared spectrum resources into three parts: a dedicated resource of a first system, a dedicated resource of a second system, and a resource obtained by a system based on contention; or, dividing the shared spectrum resources into two parts: a dedicated resource of the first system, and a resource obtained by a system based on contention; or a dedicated resource of a second system, and a resource obtained by a system based on contention. The divided shared spectrum resources are allocated to the first system and the second system.

In an exemplary embodiment of the present disclosure, the dedicated resource of the first system may include: a data transmission time T2 of the first system within a preset time period T1; and/or the dedicated resource of the second system may include: a data transmission time T3 of the second system within the preset time period T1; and/or the resource obtained by a system based on contention may include: a data transmission time T4 obtained by a system based on contention within the preset time period T1.

In an exemplary embodiment of the present disclosure, the resource obtained by a system based on contention may be determined based on one of the following manners: only allowing a transmission node in the first system to participate in contention within the T4; or, only allowing a transmission node in the second system to participate in contention within the T4; or, simultaneously allowing a transmission node in the first system and a transmission node in the second system to participate in contention within the T4.

In an exemplary embodiment of the present disclosure, resource sharing may be performed, within the T2 and/or the T3, based on one of the following resource sharing modes:

dividing the T2 and/or the T3 into the following time periods: a data transmission time of a transmission node belonging to a first operator, a data transmission time of a transmission node belonging to a second operator, and a contention time between transmission nodes belonging to different operators; or, dividing the T2 and/or the T3 into the following time periods: a data transmission time of a transmission node belonging to a first operator, and a data transmission time of a transmission node belonging to a second operator;

dividing the T2 and/or the T3 into the following time periods: a data transmission time for data transmission of transmission nodes in an identical system, and a contention time between transmission nodes in an identical system.

In an exemplary embodiment of the present disclosure, the T2, the T3 and the T4 may be determined based on one of the following determination modes:

a first determination mode of allocating a fixed value to the T4, and dynamically adjusting a ratio of the T2 to the T3, where a contention priority of the first system or the second system within the T4 changes based on the dynamically adjusted ratio of the T2 to the T3; or, a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system.

In an exemplary embodiment of the present disclosure, in the second determination mode, the first system may be a Wi-Fi system, and the second system may be an LTE system.

In an exemplary embodiment of the present disclosure, in the first determination mode, the ratio of the T2 to the T3 may be dynamically adjusted based on one of the following rules:

adopting a default configuration mode;

respectively collecting statistics on resources actually occupied, within the T2 and the T3, by the first system and the second system within a statistical time period T, and adjusting the ratio of the T2 to the T3 within a next statistical time period T based on a statistical result, where T≥2T1; or, adjusting the ratio of the T2 to the T3 within the current T1 based on effective occupation time lengths of the T2 and the T3 within a previous T1.

According to another embodiment of the present disclosure, a data transmission device is also provided, which is applied to a first system and includes an acquisition module and a transmission module. The acquisition module is configured to acquire, from shared spectrum resources, a dedicated resource of the first system and/or a contention resource obtained by the first system based on contention. The transmission module is configured to transmit data by using the dedicated resource and/or the contention resource.

In an exemplary embodiment of the present disclosure, the acquisition module may be configured to acquire the dedicated resource of the first system and/or the contention resource obtained by the first system based on contention from the shared spectrum resources divided based on one of the following division modes:

a first division mode of dividing the shared spectrum resources into a dedicated resource of the first system, a dedicated resource of a second system, and a resource obtained by a system based on contention; or, a second division mode of dividing the shared spectrum resources into: a dedicated resource of the first system, and a resource obtained by a system based on contention; or a dedicated resource of a second system, and a resource obtained by a system based on contention.

According to another embodiment of the present disclosure, a spectrum resource sharing device is also provided, which includes a division module and an allocation module. The division module is configured to divide shared spectrum resources based on one of the following division modes:

dividing the shared spectrum resources into three parts: a dedicated resource of a first system, a dedicated resource of a second system, and a resource obtained by a system based on contention; or, dividing the shared spectrum resources into two parts: a dedicated resource of the first system, and a resource obtained by a system based on contention; or a dedicated resource of a second system, and a resource obtained by a system based on contention. The allocation module is configured to allocate the divided shared spectrum resources to the first system and the second system.

By means of some embodiments of the present disclosure, shared spectrum resources are divided into dedicated resources of systems and a resource obtained based on contention. Therefore, the problem of coexistence of an LTE system with one or more other systems on the shared spectrum resources is solved, and the problem where a certain system sharing spectrum resources cannot transmit data because the system tends to fail to preempt the shared resources is further solved, thereby achieving co-existence of systems and improving fairness of resource sharing.

DETAILED DESCRIPTION OF THE EMBODIMENTS

In spectrum sharing, a system (e.g., LTE system) working on a licensed spectrum resource may be introduced to an unlicensed spectrum (i.e., shared spectrum) resource. So, the problem of coexistence of the system with one or more other systems (e.g., Wi-Fi system) using the shared spectrum resource may arise. On the basis of the problem, in some embodiments of the present disclosure, in addition to allocation of respectively-exclusive available resources to a first system (e.g., LTE system or Wi-Fi system) and a second system (e.g., Wi-Fi system or LTE system) on an unlicensed spectrum, a part of shared resources (or referred to as a resource obtained by a system based on contention or referred to as a contention resource) used in a contention mode may be introduced. Detailed description will be made hereinbelow with some embodiments.

Figure 1:
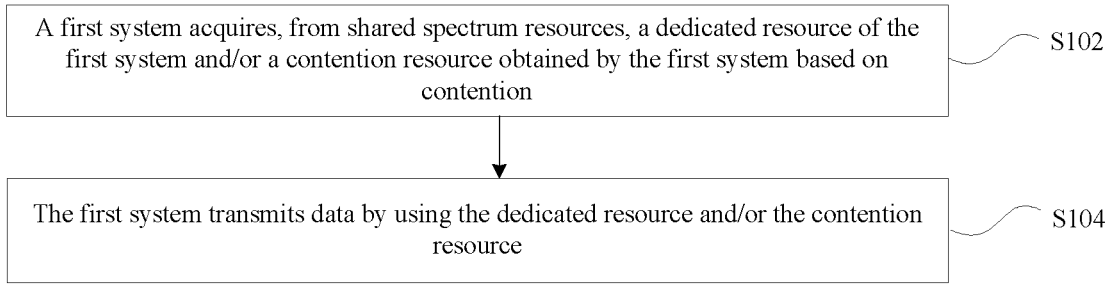
FIG. 1 is a flowchart of a data transmission method according to an embodiment of the present disclosure.

FIG. 1 is a flowchart of a data transmission method according to an embodiment of the present disclosure. As shown in FIG. 1, the method may include the acts as follows.

At act S102, a first system acquires, from shared spectrum resources, a dedicated resource of the first system and/or a contention resource obtained by the first system based on contention.

At act S104, the first system transmits data by using the dedicated resource and/or the contention resource.

By means of the above-mentioned processing acts, the first system may acquire, from the shared spectrum resources, the dedicated resource of the first system or the resource obtained by the first system based on contention, that is, a dedicated resource and a contention resource may be allocated to the first system in the shared spectrum resources. Therefore, the problem where the first system tends to fail to preempt available resources may be avoided, the problem of coexistence between different systems using shared resources may be solved, and the fairness of resource sharing may be improved.

In an embodiment, the shared spectrum resources may be divided based on one of the following division modes: a first division mode of dividing the shared spectrum resources into a dedicated resource of the first system, a dedicated resource of a second system, and a resource obtained by a system based on contention; or, a second division mode of dividing the shared spectrum resources into: a dedicated resource of the first system, and a resource obtained by a system based on contention; or a dedicated resource of a second system, and a resource obtained by a system based on contention.

Herein, the division modes may be uniformly presented as the following form of dividing the shared spectrum resources into the dedicated resource of the first system, a silent resource and the resource obtained by the system based on contention. The silent resource herein may be the dedicated resource of the first system or the dedicated resource of the second system. That is, when the silent resource is the dedicated resource of the first system, the division mode is presented as the second mode; while when the silent resource is the dedicated resource of the second system, the division mode is presented as the first mode.

In an exemplary embodiment, division of the resources may be presented as time-division use of the shared spectrum resources according to time. For example, the dedicated resource of the first system may include: a data transmission time T2 of the first system within a preset time period T1; and/or the dedicated resource of the second system may include: a data transmission time T3 of the second system within the preset time period T1; and/or the resource obtained by a system based on contention may include: a data transmission time T4 obtained by a system based on contention within the preset time period T1 (which may also be interpreted as obtaining of a resource by the system based on contention within the T4).

In an exemplary embodiment, the shared spectrum resources may be divided based on one of the following modes: setting a maximum occupation time threshold of the dedicated resource of the first system; or setting a maximum occupation time threshold of the dedicated resource of the second system. For example, if the service load of the first system is large, the first system keeps occupying resources to send data and as a result the second system tends to fail to detect available resources for data transmission. Therefore, it may be suggested to configure a maximum occupation time threshold in the first system, and the first system stops sending data at this time threshold moment. The maximum occupation time threshold may be any time not greater than T2+T3. If the maximum occupation time threshold is equal to T2+T3, the solution turns to a particular case, e.g., the second mode: a dedicated transmission time of the first system and an inter-system contention-based transmission time; or a dedicated transmission time of the second system and an inter-system contention-based transmission time. If the maximum occupation time threshold is smaller than T2+T3 (e.g., the first mode), the second system may detect that the resources are idle at the starting moment of the T3 and immediately send data to exclusively occupy resources. The second system stops sending data at the starting moment of T4. If the maximum occupation time threshold is equal to T2+T3, the first system and the second system simultaneously participate in contention for preempting resources at the starting moment of T4.

In an embodiment, the resource obtained by the system based on contention may be presented as, but not limited to, the following forms:

only allowing a transmission node in the first system to participate in contention within the T4; or, only allowing a transmission node in the second system to participate in contention within the T4; or, simultaneously allowing a transmission node in the first system and a transmission node in the second system to participate in contention within the T4.

In an exemplary embodiment, resource division may be further performed for transmission nodes in an identical system to realize sharing of the shared spectrum resources:

(1) dividing the T2 and/or the T3 into the following time periods: a data transmission time of a transmission node belonging to a first operator, a data transmission time of a transmission node belonging to a second operator, and a contention time between transmission nodes belonging to different operators; or, (2) dividing the T2 and/or the T3 into the following time periods: a data transmission time of a transmission node belonging to a first operator, and a data transmission time of a transmission node belonging to a second operator; or, (3) dividing the T2 and/or the T3 into the following time periods: a data transmission time for data transmission of transmission nodes in an identical system, and a contention time between transmission nodes in an identical system.

The T2, the T3 and the T4 may be determined based on one of the following determination modes:

a first determination mode of allocating a fixed value to the T4, and dynamically adjusting a ratio of the T2 to the T3, where a contention priority of the first system or the second system within the T4 changes based on the dynamically adjusted ratio of the T2 to the T3; or, a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system. In an actual application scenario, when the first system is the Wi-Fi system and the second system is the LTE system, the T2, the T3 and the T4 may be determined by using the second determination mode.

In an embodiment, in the first determination mode, the ratio of the T2 to the T3 may be dynamically adjusted based on, but not limited to, one of the following rules:

(1) adopting a default configuration mode;

(2) respectively collecting statistics on resources actually occupied, within the T2 and the T3, by the first system and the second system within a statistical time period T, and adjusting the ratio of the T2 to the T3 within a next statistical time period T based on a statistical result, where T≥2T1; in an exemplary implementation process, when the mode (2) is adopted, the adjustment may be performed on the basis of a default set ratio in the mode (1) during first-time statistics, and the ratio of the T2 to the T3 within the next statistical time period may be adjusted subsequently based on the situation during the previous dynamic adjustment; and (3) adjusting the ratio of the T2 to the T3 within the current T1 based on effective occupation time lengths of the T2 and the T3 within a previous T1.

In an exemplary embodiment of the present disclosure, a solution for exclusively occupying resources between different operators within a transmission time may be implemented by configuring a pattern at a background, for example, configuring a starting position of the pattern. A corresponding timing relationship may be acquired from operated stations based on the configuration information.

Figure 2:
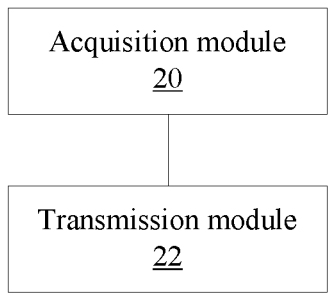
FIG. 2 is a block diagram of a data transmission device according to an embodiment of the present disclosure.

In the embodiment of the present disclosure, a data transmission device is also provided, which may be applied to a first system. The device may be used for implementing the above-mentioned method. As shown in FIG. 2, the device includes an acquisition module 20 and a transmission module 22.

The acquisition module 20 may be configured to acquire, from shared spectrum resources, a dedicated resource of the first system and/or a contention resource obtained by the first system based on contention.

The transmission module 22 is coupled to the acquisition module 20 and may be configured to transmit data by using the dedicated resource and/or the contention resource.

In an embodiment, the acquisition module 20 may be configured to acquire the dedicated resource of the first system and/or the contention resource obtained by the first system based on contention from the shared spectrum resources divided based on one of the following division modes:

a first division mode of dividing the shared spectrum resources into a dedicated resource of the first system, a dedicated resource of a second system, and a resource obtained by a system based on contention; or, a second division mode of dividing the shared spectrum resources into: a dedicated resource of the first system, and a resource obtained by a system based on contention; or a dedicated resource of a second system, and a resource obtained by a system based on contention.

It may be appreciated that each module may be implemented in a form of software or hardware. When the solution is implemented by hardware, the solution may be implemented by means of, but not limited to, the following modes: the acquisition module 20 and the transmission module 22 may be located in a first processor and a second processor respectively; or, the acquisition module 20 and the transmission module 22 may be located in an identical processor.

Figure 3:
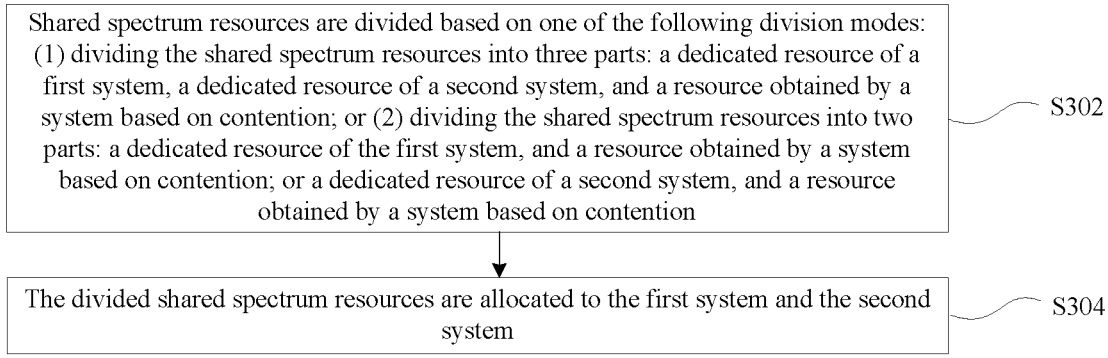
FIG. 3 is a flowchart of a spectrum resource sharing method according to an embodiment of the present disclosure.

An embodiment of the present disclosure provides a spectrum resource sharing method. As shown in FIG. 3, the method may include the acts as follows.

At act S302, shared spectrum resources are divided based on one of the following division modes:

(1) dividing the shared spectrum resources into three parts: a dedicated resource of a first system, a dedicated resource of a second system, and a resource obtained by a system based on contention; or, (2) dividing the shared spectrum resources into two parts: a dedicated resource of the first system, and a resource obtained by a system based on contention; or a dedicated resource of a second system, and a resource obtained by a system based on contention.

In an exemplary embodiment, the division mode may be implemented in the following manners. An initial transmission time T2 of transmission nodes of the first system, an initial transmission time T3 of transmission nodes of the second system, and a system contention-based transmission time T4 within a certain time (T1) may be set. Within the system contention-based transmission time T4, only a station in the first system is qualified for contention or only a station in the second system is qualified for contention or both the first system and the second system are qualified for contention.

At act S304, the divided shared spectrum resources are allocated to the first system and the second system.

In an embodiment, the dedicated resource of the first system may include: a data transmission time T2 of the first system within a preset time period T1; and/or the dedicated resource of the second system may include: a data transmission time T3 of the second system within the preset time period T1; and/or the resource obtained by a system based on contention may include: a data transmission time T4 obtained by a system based on contention within the preset time period T1. Correspondingly, the resource obtained by the system based on contention may include: only allowing a transmission node in the first system to participate in contention within the T4; or, only allowing a transmission node in the second system to participate in contention within the T4; or, simultaneously allowing a transmission node in the first system and a transmission node in the second system to participate in contention within the T4.

In an embodiment, the transmission time may be further divided according to different operators in an identical system. For example, resource sharing may be performed, within the T2 and/or the T3, based on one of the following resource sharing modes. The T2 and/or the T3 may be divided into the following time periods: a data transmission time of a transmission node belonging to a first operator, a data transmission time of a transmission node belonging to a second operator, and a contention time between transmission nodes belonging to different operators. Alternatively, the T2 and/or the T3 may be divided into the following time periods: a data transmission time of a transmission node belonging to a first operator, and a data transmission time of a transmission node belonging to a second operator. Alternatively, the T2 and/or the T3 may be divided into the following time periods: a data transmission time for data transmission of transmission nodes in an identical system, and a contention time between transmission nodes in an identical system.

The above three division modes may be interpreted as: performing resource sharing within the transmission time T2 of the first system and the transmission time T3 of the second system based on an intra-operator and/or inter-operator mode. That is, within the transmission time T2 of the first system, a transmission time of a transmission node of an operator A and a transmission time of a transmission node of an operator B are S2A and S2B respectively, and an intra-operator or inter-operator contention time in the system is S3. Within the transmission time T3 of the second system, a transmission time of a transmission node of an operator A and a transmission time of a transmission node of an operator B are Q2A and Q3B respectively, and an intra-operator or inter-operator contention time in the system is Q3. Or, within the transmission time T2 of the first system, a transmission time of a transmission node of an operator A and a transmission time of a transmission node of an operator B are S2A and S2B respectively, and there is not an intra-system contention time S3. Or, within the transmission time T3 of the second system, a transmission time of a transmission node of an operator A and a transmission time of a transmission node of an operator B are Q2A and Q3B respectively, and there is not an intra-system contention time Q3.

In an exemplary embodiment, the T2, the T3 and the T4 may be determined based on one of the following determination modes:

a first determination mode of allocating a fixed value (i.e., the system contention-based transmission time T4 is fixed) to the T4, and dynamically adjusting a ratio of the T2 to the T3, where a contention priority of the first system or the second system within the T4 is changed (e.g., increased or decreased) based on the adjusted ratio of the T2 to the T3; or, a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system.

In the second determination mode, the first system may be a Wi-Fi system, and the second system may be an LTE system. Therefore, the problem where the Wi-Fi system cannot preempt resources may be avoided. That is, in the second determination mode, a ratio of the transmission time T3 of the second system (LTE) to the system contention-based time T4 may be determined based on an actual service load of the LTE system, but it may be suggested to ensure that the transmission time of the T4 is not zero. That is to say, a transmission time occupied dynamically within the T3 is suggested to be smaller than T3+T4.

In an embodiment, in the first determination mode, the ratio of the T2 to the T3 may be dynamically adjusted based on one of the following rules. A first rule is adopting a default configuration mode. A second rule is respectively collecting statistics on resources actually occupied, within the T2 and the T3, by the first system and the second system within a statistical time period T, and adjusting the ratio of the T2 to the T3 within a next statistical time period T based on a statistical result, where T≥2T1. A third rule is adjusting the ratio of the T2 to the T3 within the current T1 based on effective occupation time lengths of the T2 and the T3 within a previous T1.

The second rule or third rule may be used for determining whether a resource obtaining priority of a certain system is increased or reduced within the contention transmission time T4, in order that a certain system has a higher probability of obtaining resources. When adopting the first rule in which a system default configuration ratio is configured, within the T4, only the first system may participate in contention, or only the second system may participate in contention, or the first system and the second system may simultaneously participate in contention for T4 resources.

In an embodiment, the solution of exclusively occupying corresponding transmission resources between different systems may be implemented in the following manner. At a starting moment of transmission time of a system, the system may forcedly send a signal to occupy resources in advance, while the other system performs resource busy/idle check, namely the system may forcedly send a signal to force the other system to quit, so as to ensure that only one system has a right to use a dedicated system. If two systems forcedly send signals simultaneously, a random back-off mechanism may be adopted.

Figure 4:
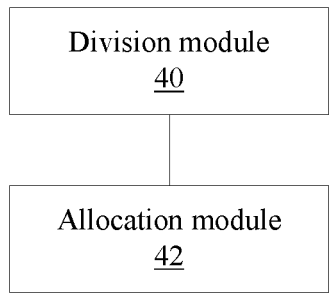
FIG. 4 is a block diagram of a spectrum resource sharing device according to an embodiment of the present disclosure.

In an embodiment, a spectrum resource sharing device is provided. The device may be used for implementing the above-mentioned method. As shown in FIG. 4, the device includes a division module 40 and an allocation module 42.

The division module 40 may be configured to divide shared spectrum resources based on one of the following division modes: dividing the shared spectrum resources into three parts: a dedicated resource of a first system, a dedicated resource of a second system, and a resource obtained by a system based on contention; or, dividing the shared spectrum resources into two parts: a dedicated resource of the first system, and a resource obtained by a system based on contention; or a dedicated resource of a second system, and a resource obtained by a system based on contention.

The allocation module 42 is coupled to the division module 40 and may be configured to allocate the divided shared spectrum resources to the first system and the second system.

It may be appreciated that each module may be implemented in a form of software or hardware. When the solution is implemented by hardware, the solution may be implemented by means of, but not limited to, the following modes. The division module 40 and the allocation module 42 may be located in a first processor and a second processor respectively; or, the division module 40 and the allocation module 42 may be located in an identical processor.

For convenience of better understanding of the above-mentioned embodiment, detailed description will be made hereinbelow with exemplary embodiments.

First Embodiment

Figure 5:
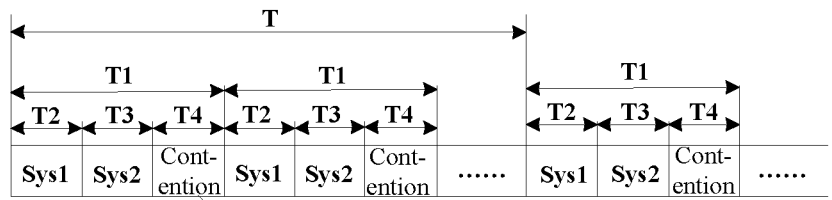
FIG. 5 is a diagram of a first system transmission time T2, a second system transmission time T3 and a system contention-based transmission time T4 under a default configuration mode in an embodiment of the present disclosure.

FIG. 5 is a diagram of a first system transmission time T2, a second system transmission time T3 and a system contention-based transmission time T4 under a default configuration mode in an embodiment of the present disclosure. The figure schematically shows a contention qualification situation within the contention transmission time T4.

In the present embodiment, a transmission time ratio of T2, T3 and T4 is 1:1:1 according to default configurations, that is, T1 is equally divided into three parts in default, and a time allocation ratio in the whole transmission process is fixed.

However, within a system contention-based transmission time T4, resources within the T4 may be obtained by a system based on contention based on three rules. The main three rules are as follows.

Within the transmission time T4, only a transmission node in a first system (Sys1) is allowed to participate in contention, and a second system (Sys2) is not qualified for contention.

Within the transmission time T4, only a transmission node in Sys2 is allowed to participate in contention, and Sys1 is not qualified for contention.

Within the transmission time T4, transmission nodes in both Sys1 and Sys2 are qualified for participating in contention simultaneously, namely, have an equal contention priority.

In this embodiment, Sys1 and Sys2 may be an LTE or Wi-Fi system.

Second Embodiment

Figure 6:
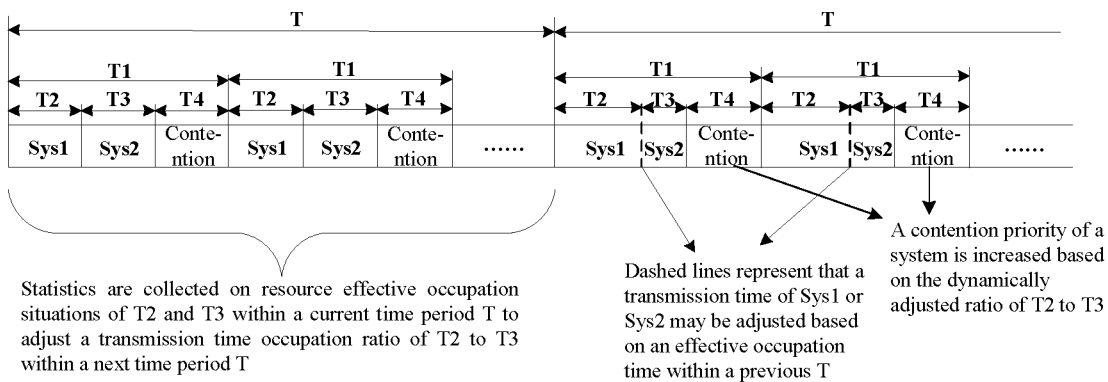
FIG. 6 is a diagram where a time occupation ratio of a first system (Sys1) to a second system (Sys2) within a next time period T is adjusted based on an effective occupation statistic of resources within a time period T so as to determine a contention priority of a system within a contention time T4 in an embodiment of the present disclosure.

FIG. 6 is a diagram where a time occupation ratio of a first system (Sys1) to a second system (Sys2) within a next time period T is adjusted based on an effective occupation statistic of resources within a time period T so as to determine a contention priority of a system within a contention time T4 in an embodiment of the present disclosure.

Specifically, in the present embodiment, within a first T, based on a fixed ratio T2:T3:T4=1:1:1, it is statistically obtained that a first system is fully loaded within a given transmission time T2 and a second system is not fully loaded, so within the next T, idle resources in the second system are correspondingly adjusted to the first system. Meanwhile, within a system contention transmission time T4, the first system may automatically increase its own contention priority, and vice versa. If both the first system and the second system are not fully loaded or fully loaded, a ratio of T2 to T3 is not adjusted within the next T, and the two systems have an equal contention priority within the T4 accordingly.

That is to say, it is supposed that both the transmission time T2 and the transmission time T3 are equally divided into five parts within the current T. It is statistically obtained, within the time period T, that the effective occupation statistic of the T2 of the first system is full occupation of the five parts (i.e., fully loaded), three parts (i.e., not fully loaded) of the T3 of the second system are effectively occupied whilst two parts are idle. So, within the next time period T, the transmission time T3 of the second system is adjusted to be divided into three parts, and the transmission time T2 of the first system is adjusted to be divided into seven parts. Meanwhile, within the system contention transmission time T4, the contention priority grade of the first system is increased, in order to occupy resources with a higher probability. Otherwise, the first system is not fully loaded, and the second system is fully loaded. Likewise, no more details are made herein.

In this embodiment, Sys1 and Sys2 may be an LTE or Wi-Fi system. Meanwhile, once an adjustment ratio of T2 to T3 is changed, the ratio may be fixed within the time period T.

Third Embodiment

Figure 7:
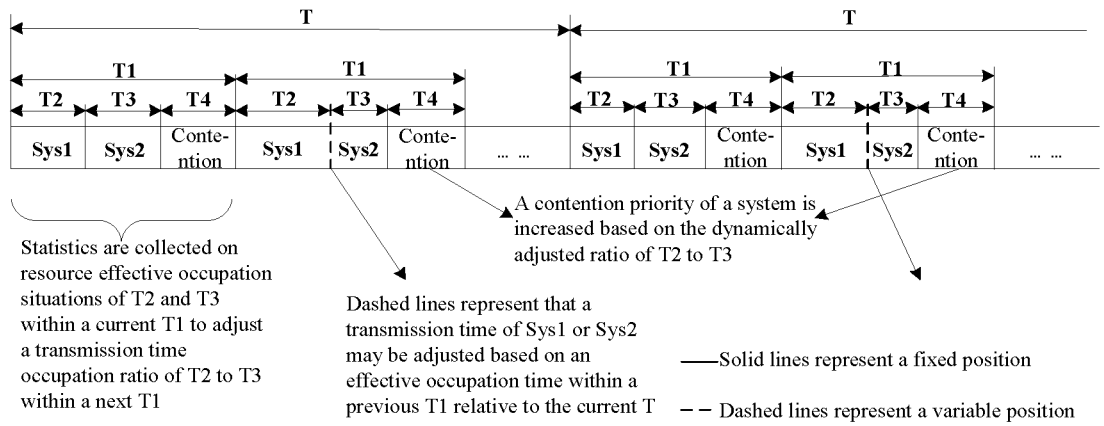
FIG. 7 is a diagram where a time occupation ratio of a first system (Sys1) to a second system (Sys2) within the current T1 is adjusted based on effective occupation time lengths of the first system (Sys1) and the second system (Sys2) within a previous T1 so as to determine a contention priority of a system within a contention time T4 in an embodiment of the present disclosure.

FIG. 7 is a diagram where a time occupation ratio of a first system (Sys1) to a second system (Sys2) within the current T1 is adjusted based on effective occupation time lengths of the first system (Sys1) and the second system (Sys2) within a previous T1 so as to determine a contention priority of a system within a contention time T4 in an embodiment of the present disclosure.

Specifically, in the present embodiment, a transmission time T2 and a transmission time T3 are adjusted based on effective occupation time lengths, with a previous T1, of Sys1 within the T2 and Sys2 within the T3. The contention priority of Sys1 or Sys2 is increased or reduced based on adjustment situations of the first two parts T2 and T3.

Within the first T1, a ratio T2:T3:T4=1:1:1 is set in default, and it is supposed that the transmission time T2 and the transmission time T3 are equally divided into five parts. Within the first T1, the transmission time T2 within the next T1 is adjusted based on an effective occupation time situation of Sys1 within the T2. That is, if an effective occupation time ratio of Sys1 is 3/5 (i.e., not fully loaded) and an effective occupation time ratio of Sys2 is 5/5 (fully loaded) within the first T1, the transmission time of Sys2 is adjusted to be divided into seven parts (5+2) whilst the transmission time of Sys1 is shortened to contain three parts within the next T1. Meanwhile, a contention priority of Sys2 within a system contention time T4 is increased. If an effective occupation time ratio of Sys1 is 5/5 (i.e., fully loaded) and an effective occupation time ratio of Sys2 is 3/5 (i.e., not fully loaded) within the first T1, the transmission time of Sys1 is adjusted to be divided into seven parts (5+2) whilst the transmission time of Sys2 is shortened to contain three parts within the next T1. Meanwhile, a contention priority of Sys1 within the system contention time T4 is increased.

In an embodiment, if an effective occupation time ratio of Sys1 is 3/5 (i.e., not fully loaded) and an effective occupation time ratio of Sys2 is 2/5 (i.e., not fully loaded) within the first T1, the ratio of T2 to T3 is still 1:1 within the next T1, and Sys1 and Sys2 within the system contention time T4 have an equal contention priority.

In this embodiment, Sys1 and Sys2 may be an LTE or Wi-Fi system.

Fourth Embodiment

Figure 8:
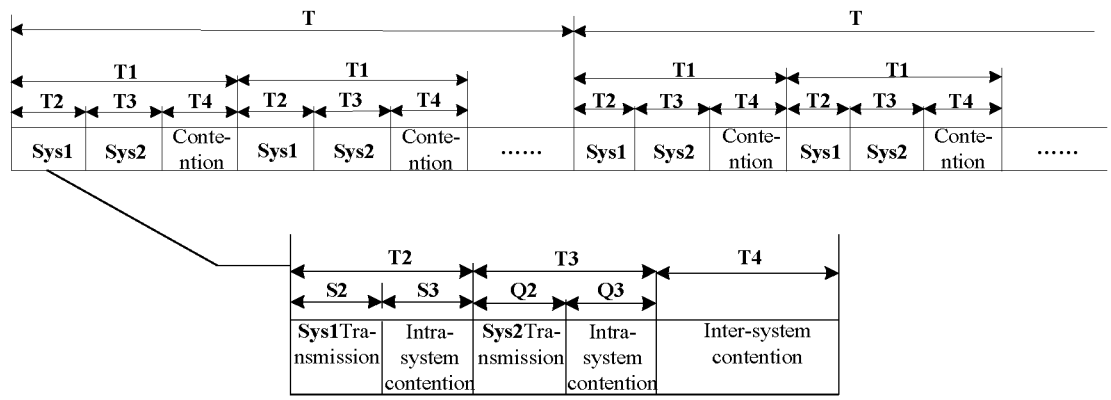
FIG. 8 is a diagram of a resource sharing mode based on both inter-system contention and intra-system contention within a certain transmission time T1 in an embodiment of the present disclosure.

FIG. 8 is a diagram of a resource sharing mode based on both inter-system contention and intra-system contention within a certain transmission time T1 in an embodiment of the present disclosure.

In the present embodiment, it is supposed that a transmission time is defined as S2 within a transmission time T2 of a first system, and a contention transmission time in the first system is S3. Within the transmission time S2, all transmission nodes belonging to the first system may be used for transmission, and within the contention transmission time S3 in the system, transmission nodes in the first system occupy S3 resources in a contention mode.

In an embodiment, a transmission time is defined as Q2 within a transmission time T3 of a second system, and a contention transmission time in the second system is Q3. Within the Q2, transmission nodes in the second system are used for transmission, and within the contention transmission time Q3, the transmission nodes in the second system occupy Q3 resources in a contention mode.

Within a system contention transmission time T4, the first system and the second system occupy resources in a contention mode. In this case, within the contention time T4, if a ratio of the T2 to the T3 is configured in default and fixed, inter-system intention may still adopt a contention occupation qualification mode specified in the first embodiment. If the ratio of the T2 to the T3 is adjusted based on an effective occupation time total statistic within the time period T in the second embodiment and the third embodiment or a single effective occupation time within the transmission time T1, a contention priority of the corresponding system within the T4 may be increased based on rules in the second embodiment and the third embodiment.

Specifically, in the present embodiment, the transmission time T2 only belongs to a transmission time of an LTE or Wi-Fi system. Within this period of time, the LTE or Wi-Fi system may use the resource in a coordination mode. In the present embodiment, it is not distinguished whether operators are identical or different in the first system and the second system.

In this embodiment, Sys1 and Sys2 may be the LTE or Wi-Fi system.

Fifth Embodiment

Figure 9:
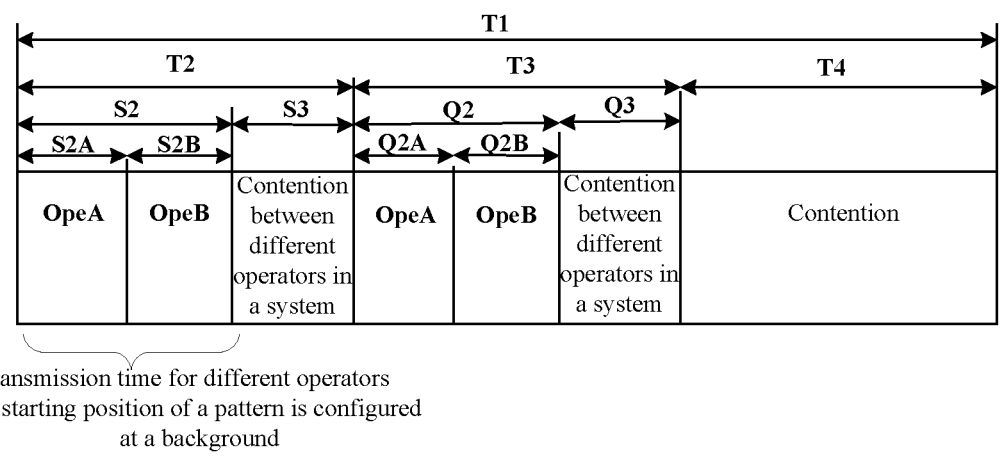
FIG. 9 is a diagram of a resource sharing mode based on both inter-system contention and contention between different operators in a system within a certain transmission time T1 in an embodiment of the present disclosure.

FIG. 9 is a diagram of a resource sharing mode based on both inter-system contention and contention between different operators in a system within a certain transmission time T1 in an embodiment of the present disclosure.

In the present embodiment, as shown in FIG. 9, within a transmission time T2 of a first system, a transmission time S2A of an operator A is defined, a transmission time S2B of an operator B is defined, and an inter-operator contention transmission time S3 is defined. A second system adopts the same division mode as the first system. Within an inter-system contention transmission time T4, the first system and the second system occupy resources in a contention mode. In this case, within the contention time T4, if a ratio of the T2 to the T3 is configured in default and fixed, inter-system intention may still adopt a contention occupation qualification mode specified in the first embodiment. If the ratio of the T2 to the T3 is adjusted based on an effective occupation time total statistic within the time period T in the second embodiment and the third embodiment or a single effective occupation time within the transmission time T1, a contention priority of the corresponding system within the T4 may be increased based on rules in the second embodiment and the third embodiment.

For a transmission time between different operators in the identical system within the T2 or the T3, a starting position of a pattern may be configured at a background (i.e., a corresponding timing relationship is acquired from an operated station based on configuration information) or appointed detection is performed before access so as to discover resources in the periods of the T2 or the T3.

If a pattern mode is fixedly configured through the background, a ratio of the transmission time S2A of the operator A to the transmission time S2B of the operator B to the intra-system inter-operator contention transmission time S3 within the T2 is unchanged, and an inter-operator contention priority within the intra-system inter-operator contention time S3 may be based on the rules in the first embodiment. If the mode is dynamically adjusted based on a detection result, for an inter-operator transmission time ratio within the T2, a transmission time length of an operator may be adjusted based on a single operator effective occupation time actually detected within the T1 or the total statistic of the operator effective occupation time actually detected within the T, and an intra-system inter-operator contention priority may be based on similar rules in the second embodiment and the third embodiment.

In this embodiment, Sys1 and Sys2 may be an LTE or Wi-Fi system.

Sixth Embodiment

Figure 10:
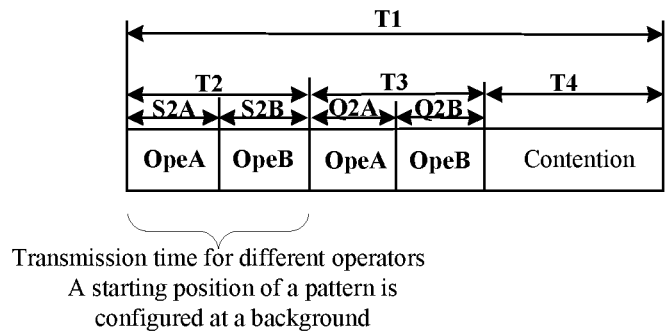
FIG. 10 is a diagram of resource sharing based on a situation, where inter-system contention and inter-operator contention in the same system coexist but intra-system contention does not exist, within a certain transmission time T1 in an embodiment of the present disclosure.

FIG. 10 is a diagram of resource sharing based on a situation, where inter-system contention and inter-operator contention in the same system coexist but intra-system contention does not exist, within a certain transmission time T1 in an embodiment of the present disclosure.

The present embodiment may be regarded as a particular case of the fifth embodiment. The unique difference lies in absence of an intra-system contention transmission time.

In this embodiment, Sys1 and Sys2 may be an LTE or Wi-Fi system.

Seventh Embodiment

Figure 11:
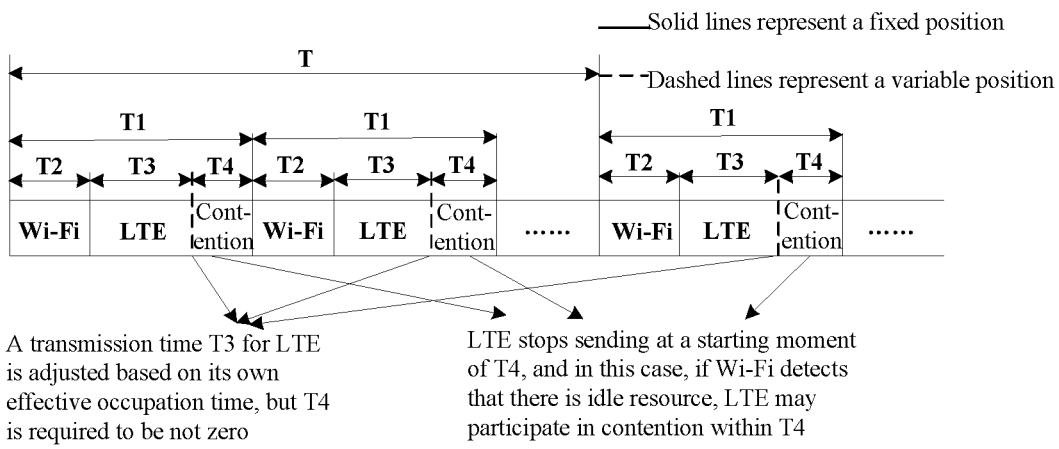
FIG. 11 is a diagram where a transmission time T2 is fixedly configured for a Wi-Fi system within a certain transmission time T1 and a transmission time T3 and a transmission time T4 are dynamically variable in an embodiment of the present disclosure.

FIG. 11 is a diagram where a transmission time T2 is fixedly configured for a Wi-Fi system within a certain transmission time T1 and a transmission time T3 and a transmission time T4 are dynamically variable in an embodiment of the present disclosure.

Specifically, in the present embodiment, a transmission time T2 of a first system is fixedly configured for a Wi-Fi system, and the time T2 configured by a background within each T1 is fixed. A transmission time T3 is used for an LTE system, a ratio of the transmission time T3 to an inter-system contention time T4 is dynamically variable, the occupied transmission time T3 depends on an actual service demand of the LTE system, but the T3 cannot completely occupy the total time of T3+T4, that is to say, the transmission time T4 is required to be not zero. At a starting moment of T4, the LTE system must stop sending data, in order that the Wi-Fi system participates in contention when detecting idle resources. Within the contention transmission time T4, a contention priority is determined based on a resource effective occupation ratio of the T2 and a service load of the LTE system.

Eighth Embodiment

Figure 12:
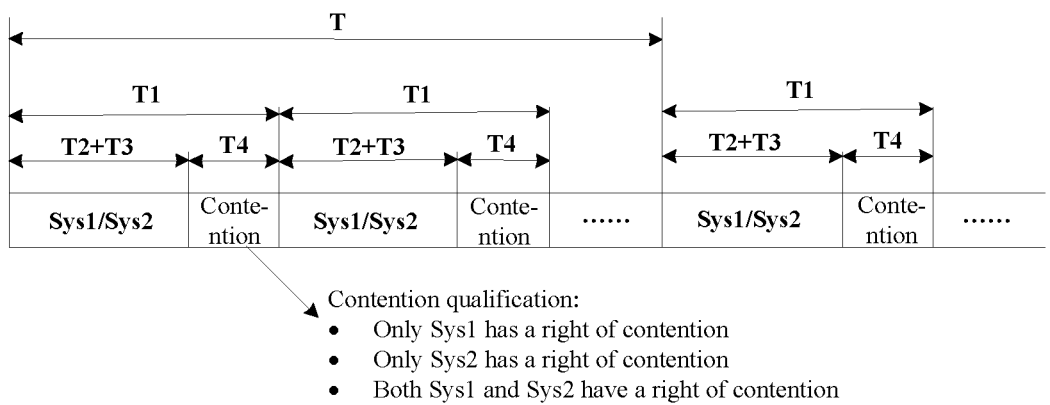
FIG. 12 is a diagram where only one system conducts transmission within the transmission time T2+T3 (which is a particular case of FIG. 5) in an embodiment of the present disclosure.

FIG. 12 is a diagram where only one system conducts transmission within the transmission time T2+T3 (which is a particular case of FIG. 5) in an embodiment of the present disclosure.

Specifically, in the present embodiment, starting from a transmission time T2, a first system or a second system is forced to send a signal due to a large service volume, thus ensuring that the other system tends to fail to detect idle resources and to transmit data. Data sending is stopped until a configured maximum occupation time threshold of the first system or the second system is reached. In this case, a spectrum sharing solution turns, from original three parts, to two parts: LTE transmission time (T2+T3)+inter-system contention transmission time T4 or Wi-Fi transmission time (T2+T3)+inter-system contention transmission time T4. The maximum occupation time threshold here is T2+T3. Starting from the transmission time T4, the first system and the second system preempt resources by using a contention mechanism.

To sum up, the embodiments of the present disclosure achieve the beneficial effects as follows.

The embodiments of the present disclosure can solve the problem of fair and friendly coexistence of different systems (e.g., LTE system and Wi-Fi system). Respective exclusive resources are allocated to the LTE system and the Wi-Fi system, so it can be ensured that the two systems have a part of respective available resources to achieve relative fairness. Meanwhile, a different-system contention part is also introduced, which enables those systems having large service demands to use remaining shared resources through a contention mechanism so as to meet the demands on the basis of ensuring that the two systems have some available resources. This mode not only can ensure that some resources are available to the Wi-Fi system having service demand, but also can share service loads of the LTE system over licensed carriers. Meanwhile, an opportunity of fair contention for occupation resources is given to the LTE system and the Wi-Fi system, idle resources on unlicensed carriers are fully utilized, the utilization rate of shared spectrum resources is improved, and a larger data rate transmission is achieved.

In another embodiment, software is also provided. The software is used for executing the solution described in the above-mentioned embodiments and preferable implementation modes.

In another embodiment, a storage medium is also provided. The above-mentioned software is stored in the storage medium. The storage medium includes, but is not limited to, an optical disk, a floppy disk, a hard disk, an erasable memory and the like.

Obviously, a person skilled in the art shall understand that all of the above-mentioned modules or acts in the present disclosure may be implemented by using a general calculation device, may be centralized on a single calculation device or may be distributed on a network composed of multiple calculation devices. In an embodiment, they may be implemented by using executable program codes of the calculation devices. Thus, they may be stored in a storage device and executed by the calculation devices, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to a combination of any specific hardware and software.

The above is only the preferable embodiments of the present disclosure, and not intended to limit the present disclosure. As will occur to a person skilled in the art, the present disclosure is susceptible to various modifications and changes. Any modifications, equivalent replacements, improvements and the like made within the principle of the present disclosure shall fall within the scope of protection defined by the appended claims of the present disclosure.

INDUSTRIAL APPLICABILITY

By means of some embodiments of the present disclosure, shared spectrum resources may be divided into dedicated resources of systems and a resource obtained based on contention. Therefore, the problem of coexistence of an LTE system with one or more other systems on the shared spectrum resources is solved, and the problem where a certain system sharing spectrum resources cannot transmit data because the system tends to fail to preempt the shared resources is further solved, thereby achieving co-existence of systems and improving fairness of resource sharing.

What is claimed is:

1. A data transmission method, comprising:
acquiring, from shared spectrum resources by a first system or operator, a dedicated resource of the first system or operator, and/or a contention resource based on priority class; and
transmitting, by the first system or operator, data by using the dedicated resource and/or the contention resource;
wherein acquiring, from shared spectrum resources by a first system or operator, a dedicated resource of the first system or operator, and/or a contention resource based on priority class, comprise one of the following at least:

systems or operators with high priority classes can obtain more dedicated resources and/or can obtain contention resource with greater probability;
wherein the dedicated resource of the first system comprises: a data transmission time T2 of the first system within a preset time period T1; and/or the dedicated resource of the second system comprises: a data transmission time T3 of the second system within the preset time period T1;
wherein resource sharing is performed, within the T2 and/or the T3, based on one of the following resource sharing modes: dividing the T2 and/or the T3 into the following time periods: a data transmission time of a transmission node belonging to a first operator, a data transmission time of a transmission node belonging to a second operator, and a contention time between transmission nodes belonging to different operators; dividing the T2 and/or the T3 into the following time periods: a data transmission time of a transmission node belonging to a first operator, and a data transmission time of a transmission node belonging to a second operator; dividing the T2 and/or the T3 into the following time periods: a data transmission time for data transmission of transmission nodes in an identical system, and a contention time between transmission nodes in an identical system.

2. The method as claimed in claim 1, wherein the resource obtained by a system based on contention comprises: a data transmission time T4 obtained by a system based on contention within the preset time period T1.

3. The method as claimed in claim 2, wherein the T2, the T3 and the T4 are determined based on one of the following determination modes:
a first determination mode of allocating a fixed value to the T4, and dynamically adjusting a ratio of the T2 to the T3, where a contention priority of the first system or the second system within the T4 changes based on the dynamically adjusted ratio of the T2 to the T3; or,
a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system.

4. The method as claimed in claim 3, wherein in the second determination mode, the first system is a Wireless Fidelity (Wi-Fi) system, and the second system is a Long-Term Evolution (LTE) system.

5. A spectrum resource sharing method, comprising:
dividing shared spectrum resources into at least one of: a dedicated resource of a first system or operator, a dedicated resource of a second system or operator, and a contention-based resource; and
allocating the divided shared spectrum resources to the first system or operator, and the second system or operator, obtain dedicated resources of the first system or operator, and/or contention resource based on priority class-;
wherein obtain dedicated resources of the first system or operator, and/or contention resource based on the priority class, comprise one of the following at least:
systems or operators with high priority classes can obtain more dedicated resources and/or can obtain contention resource with greater probability;
wherein the dedicated resource of the first system comprises: a data transmission time T2 of the first system within a preset time period T1; and/or the dedicated resource of the second system comprises: a data transmission time T3 of the second system within the preset time period T1;
wherein resource sharing is performed, within the T2 and/or the T3, based on one of the following resource sharing modes: dividing the T2 and/or the T3 into the following time periods: a data transmission time of a transmission node belonging to a first operator, a data transmission time of a transmission node belonging to a second operator, and a contention time between transmission nodes belonging to different operators; dividing the T2 and/or the T3 into the following time periods: a data transmission time of a transmission node belonging to a first operator, and a data transmission time of a transmission node belonging to a second operator; dividing the T2 and/or the T3 into the following time periods: a data transmission time for data transmission of transmission nodes in an identical system, and a contention time between transmission nodes in an identical system.

6. The method as claimed in claim 5, wherein the resource obtained by a system based on contention comprises: a data transmission time T4 obtained by a system based on contention within the preset time period T1.

7. The method as claimed in claim 6, wherein the T2, the T3 and the T4 are determined based on one of the following determination modes:
a first determination mode of allocating a fixed value to the T4, and dynamically adjusting a ratio of the T2 to the T3, where a contention priority of the first system or the second system within the T4 changes based on the dynamically adjusted ratio of the T2 to the T3; or,
a second determination mode of allocating a fixed value to the T2, and dynamically adjusting a ratio of the T3 to the T4, where contention priorities of the first system and the second system within the T4 are determined based on an effective resource occupation ratio of the first system within the T2 and a service load of the second system.

8. The method as claimed in claim 7, wherein in the second determination mode, the first system is a Wireless Fidelity (Wi-Fi) system, and the second system is a Long-Term Evolution (LTE) system.

9. A data transmission device, applied to a first system or operator, the device comprising a hardware processor configured to execute program modules comprising:
an acquisition module, configured to acquire, from shared spectrum resources, a dedicated resource of the first system or operator, and/or a contention resource based on priority class; and
a transmission module, configured to transmit data by using the dedicated resource and/or the contention resource;
wherein an acquisition module, comprise one of the following at least:
systems or operators with high priority classes can obtain more dedicated resources and/or can obtain contention resource with greater probability;
wherein the dedicated resource of the first system comprises: a data transmission time T2 of the first system within a preset time period T1; and/or the dedicated resource of the second system comprises: a data transmission time T3 of the second system within the preset time period T1;
wherein resource sharing is performed, within the T2 and/or the T3, based on one of the following resource sharing modes: dividing the T2 and/or the T3 into the following time periods: a data transmission time of a transmission node belonging to a first operator, a data transmission time of a transmission node belonging to a second operator, and a contention time between transmission nodes belonging to different operators; dividing the T2 and/or the T3 into the following time periods: a data transmission time of a transmission node belonging to a first operator, and a data transmission time of a transmission node belonging to a second operator; dividing the T2 and/or the T3 into the following time periods: a data transmission time for data transmission of transmission nodes in an identical system, and a contention time between transmission nodes in an identical system-.

10. A spectrum resource sharing device, comprising a hardware processor configured to execute program modules comprising:
a division module, configured to divide shared spectrum resources into at least one of: a dedicated resource of a first system or operator, a dedicated resource of a second system or operator, and a resource obtained by a system based on contention; and
an allocation module, configured to allocate the divided shared spectrum resources to the first system or operator, and the second system or operator, obtain dedicated resources of the first system or operator, and/or contention resource based on priority class;
wherein obtain dedicated resources of the first system or operator, and/or contention resource based on the priority class, comprise one of the following at least:
systems or operators with high priority classes can obtain more dedicated resources and/or can obtain contention resource with greater probability;
wherein the dedicated resource of the first system comprises: a data transmission time T2 of the first system within a preset time period T1; and/or the dedicated resource of the second system comprises: a data transmission time T3 of the second system within the preset time period T1;
wherein resource sharing is performed, within the T2 and/or the T3, based on one of the following resource sharing modes: dividing the T2 and/or the T3 into the following time periods: a data transmission time of a transmission node belonging to a first operator, a data transmission time of a transmission node belonging to a second operator, and a contention time between transmission nodes belonging to different operators; dividing the T2 and/or the T3 into the following time periods: a data transmission time of a transmission node belonging to a first operator, and a data transmission time of a transmission node belonging to a second operator; dividing the T2 and/or the T3 into the following time periods: a data transmission time for data transmission of transmission nodes in an identical system, and a contention time between transmission nodes in an identical system.

11. The method as claimed in claim 2, wherein
one statistical time period comprises a plurality of preset time periods T1, and the time occupation ratio of the first system to the second system is fixed within one statistical time period; or,
one statistical time period is equal to one preset time period T1.

12. The method as claimed in claim 2, wherein
in a case where a service volume of the first system exceeds a threshold, the first system forces to send a signal starting from the data transmission time T2 of the first system until a maximum occupation time threshold; or,
in a case where a service volume of the second system exceeds a threshold, the second system forces to send a signal starting from the data transmission time T2 of the first system until a maximum occupation time threshold.

13. The method as claimed in claim 12, wherein the maximum occupation time threshold is equal to T2+T3, so that the first system or the second system occupies the entire T2+T3;
starting from T4, only the first system participates in contention within the T4; or, only the second system participates in contention within the T4; or, the first system and the second system simultaneously participate in contention within the T4.

14. The method as claimed in claim 5, wherein in a case where a service volume of the first system exceeds a threshold, the first system forces to send a signal starting from the data transmission time T2 of the first system until a maximum occupation time threshold; or,
in a case where a service volume of the second system exceeds a threshold, the second system forces to send a signal starting from the data transmission time T2 of the first system until a maximum occupation time threshold,
wherein the maximum occupation time threshold is equal to T2+T3, so that the first system or the second system occupies the entire T2+T3;
starting from T4, only the first system participates in contention within the T4; or, only the second system participates in contention within the T4; or, the first system and the second system simultaneously participate in contention within the T4.

15. The method as claimed in claim 1, wherein acquiring, from shared spectrum resources by a first system or operator, a dedicated resource of the first system or operator, and/or a contention resource based on one of the following at least: full load or non-full load, configuration pattern, actual load requirement, default rules.

16. The method as claimed in claim 15, wherein acquiring, from shared spectrum resources by a first system or operator, a dedicated resource of the first system or operator, and/or a contention resource based on at least one of the following: full load or non-full load, a starting position of the configuration pattern, actual load requirement, default rules, comprise one of the following at least:
a system or operator with full load can occupy more dedicated resource for a period of time, and/or have a greater probability of acquiring contention resource;
depending on the configuration pattern, the system or operator determines the dedicated resource, and/or, determines the starting position of the contention resource;
based on actual service demand, the system or operator determines a portion of the dedicated resource occupied by the actual transmission, and/or, determines a portion of the contention resource that does not require competition.

* * * * *